United States Patent [19]

Chandler

[11] 4,246,452
[45] Jan. 20, 1981

[54] SWITCH APPARATUS

[75] Inventor: David P. Chandler, Downey, Calif.

[73] Assignee: Mattel, Inc., Hawthorne, Calif.

[21] Appl. No.: 1,237

[22] Filed: Jan. 5, 1979

[51] Int. Cl.³ .................. H01H 13/70; H01H 25/00
[52] U.S. Cl. ............................. 200/5 A; 200/6 A; 200/292
[58] Field of Search ............... 200/5 A, 86 R, 159 B, 200/292, 6 A; 364/705, 709, 712

[56] References Cited

U.S. PATENT DOCUMENTS

| | | | |
|---|---|---|---|
| 3,005,055 | 10/1961 | Mattke | 200/6 A X |
| 3,383,487 | 5/1968 | Wiener | 200/292 X |
| 3,676,615 | 7/1972 | Wiedmer | 200/5 R |
| 3,676,616 | 7/1972 | Wiedmer | 200/5 R |
| 3,742,157 | 6/1973 | Leposavic | 200/5 A |
| 3,898,421 | 8/1975 | Suzumura | 200/5 A X |
| 3,996,429 | 12/1976 | Chu et al. | 200/5 A |
| 4,029,915 | 6/1977 | Ojimu | 200/5 A X |
| 4,066,851 | 1/1978 | White et al. | 200/292 X |
| 4,145,584 | 3/1979 | Otterlei | 200/159 B |

OTHER PUBLICATIONS

IBM Tech. Disc. Bull., Lester et al., "Switch", vol. 11, No. 11, Apr. 1969, p. 1569.

Primary Examiner—James R. Scott
Attorney, Agent, or Firm—John G. Mesaros; Max E. Shirk; Ronald M. Goldman

[57] ABSTRACT

A switch apparatus having first and second surfaces with conductive pattern segments thereon in proximate spaced overlying relation, each of the patterns being generally identical and having a circular array of alternating solid and interleaved conductive portion, one pattern being movable toward the other by tilting of a disc for providing a plurality of discrete signals.

23 Claims, 6 Drawing Figures

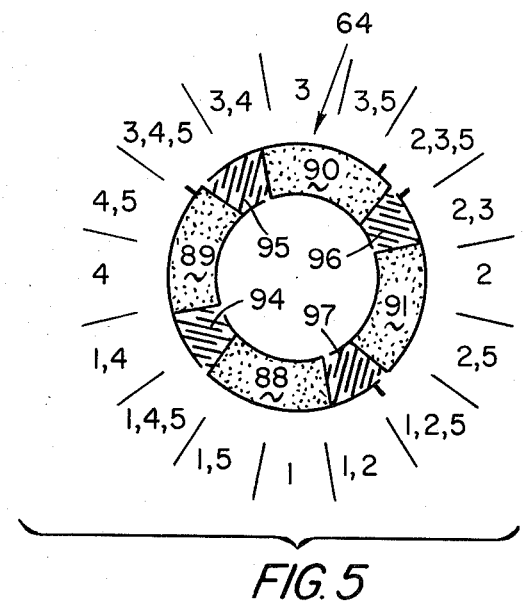

SWITCH APPARATUS

BACKGROUND OF THE INVENTION

The background of the invention will be discussed in two parts:

1. Field of the Invention

This invention relates to switch apparatus and more particularly to a printed circuit type switch apparatus.

2. Background of the Invention

In the advancement of electronic technology, improvements have been made in switches and controllers resulting in substantial reduction in size of keyboard calculators and the like. In prior art devices controllers and switches utilized discrete conductive segments such as studs or conductive bosses for electrical contact points, these contact points normally operating in conjunction with other discrete electrically conductive components. For example, in U.S. Pat. No. 3,005,055 a circuit selector is illustrated for replacing the conventional rotary dial on a rotary dial telephone. The circuit selector switch of this patent utilizes a tilting dial or disc centrally suspended above a fixed surface, the point of depression of the disc completing an electrical circuit between adjacent electrically conductive points on the surface.

Printed circuit board switches utilizing flexible materials such as flexible insulating layers are shown and described in U.S. Pat. Nos. 3,911,234; 4,017,697; 4,029,915; 4,045,636; 4,060,703; and 4,081,898. The devices of these patents are representative of the state of technology of switch assemblies for keyboards and the like utilizing printed circuit boards or printed circuits on flexible carriers. Of this group of patents, U.S. Pat. No. 4,029,915 discloses a miniaturized calculator keyboard switch assembly having a universally pivoted key actuator wherein the key actuator is adapted to be tilted in any one of four directions by the fingertip of the user to input a selected one of our different information signals from the key to a calculator circuit located within the body thereof.

U.S. Pat. No. 3,911,234 discloses a keyboard type switch assembly formed from a flexible printed circuit folded about an aperture spacer so that contacts on the circuit face may be depressed through the aperture for engagement with a spaced conductive surface by flexure of the circuit.

With the advent of electronic games adapted for use by connection to a cathode ray tube or a standard television receiver, an image displayed on the cathode ray tube has the position thereof controlled in response to a manual input through a controller by the operator. The control means utilized presently for such electronic games include electromechanical joysticks or other position control means such as rheostats, which require rotation of a knob in the clockwise or counterclockwise direction for positioning the object on the screen. With the rotary type controller, the position of the image or object on the screen which is controllable by the operator is generally limited to a straight line, that is along a horizontal line or a vertical line with other controls being required to effect movement in the other direction.

On the other hand, with a joystick, a plurality of control directions are obtainable by manipulation of the joystick to effect diagonal movement of the image as well as horizontal or vertical. However, due to the electromechanical construction of the joystick switch, such switches are not the most desirable from a reliability standpoint. Additionally, if additional control inputs are required, separate control switches are required to effect manipulation of the electronic game variables. Furthermore, with the projecting joystick, joystick switches may be subject to breakage if excessive force is applied.

Accordingly, it is an object of the present invention to provide a new and improved switch apparatus.

It is another object of the invention to provide a new and improved switch apparatus utilizing printed circuits arranged in a pattern to provide a plurality of discrete directional control signals.

It is a further object of the present invention to provide a new and improved hand held controller utilizing flexible printed circuits formed from a single sheet of material for providing direction inputs to a system as well as control inputs.

SUMMARY OF THE INVENTION

The foregoing and other objects of the invention are accomplished by providing a housing configured for receiving a flexible foldable sheet having printed circuit conductive patterns or conductors thereon, the patterns and conductors being so configured and arranged that when assembled, the switch provides a directional signal control portion, a keyboard portion and a switch portion.

The flexible sheet is provided with three sections of substantially identical planar configuration, with two adjacent sections having printed circuit conductors and conductive patterns thereon with the third section being an insulating section adapted for interposing between the first two sections when folded. In the folded condition, the first and second sections have the conductive patterns thereon in facing relation with the insulating section having apertures therein in alignment with opposing conductive patterns adapted, upon flexing of one of the sheets, for providing circuit closure.

The keyboard portion is arranged with three rows of four "buttons" each with the switch portion being along the side edges of the controller housing with the conductive patterns suitably interconnected for providing right hand or left hand operation.

The directional control portion is formed from first and second concentric rings on each of the first and second sections respectively with the patterns for each ring being substantially identical but offset relative to each other. Each ring includes a first plurality of generally identical fully conductive arcuate segments separated by a second plurality of arcuate segments, each of which includes a plurality of interleaved spaced conductor pairs positioned along a secant. The interleaved segments extend through an arc approximately ½ the arc of the fully conductive segments. The patterns are displaced relative to each other an angle generally approximating the arc of an interleaved segment. On one of the patterns, all fully conductive segments and one of the pairs of interleaved conductors from each of the adjacent interleaved segments are electrically interconnected, with the other of the pair of interleaved conductors not connected thereto being electrically interconnected. On the other pattern, each fully conductive arcuate segment is provided with a separate conductive lead and is connected to one of the pairs of interleaved conductors from each of the adjacent interleaved segments.

A portion of one pattern is brought into contact with a portion of the other pattern by means of a disc engaging one of the patterns, depression of the disc at a peripheral location determining the contact point. In the embodiment illustrated, four fully conductive arcuate segments are utilized in each pattern to provide sixteen unique five-bit binary number signals.

Other objects, features and advantages of the invention will become apparent from a reading of the specification when taken in conjunction with the drawings in which like reference numerals refer to like elements in the several views.

BRIEF DESCRIPTION OF THE DRAWINGS

FIG. 5 is a diagrammatic view depicting the control signals obtainable in the directional signal control portion of the switch apparatus of FIG. 1; and FIG. 6 is a general system block diagram illustrating the use of the switch apparatus of FIG. 1.

DESCRIPTION OF THE PREFERRED EMBODIMENT

Figure 1:
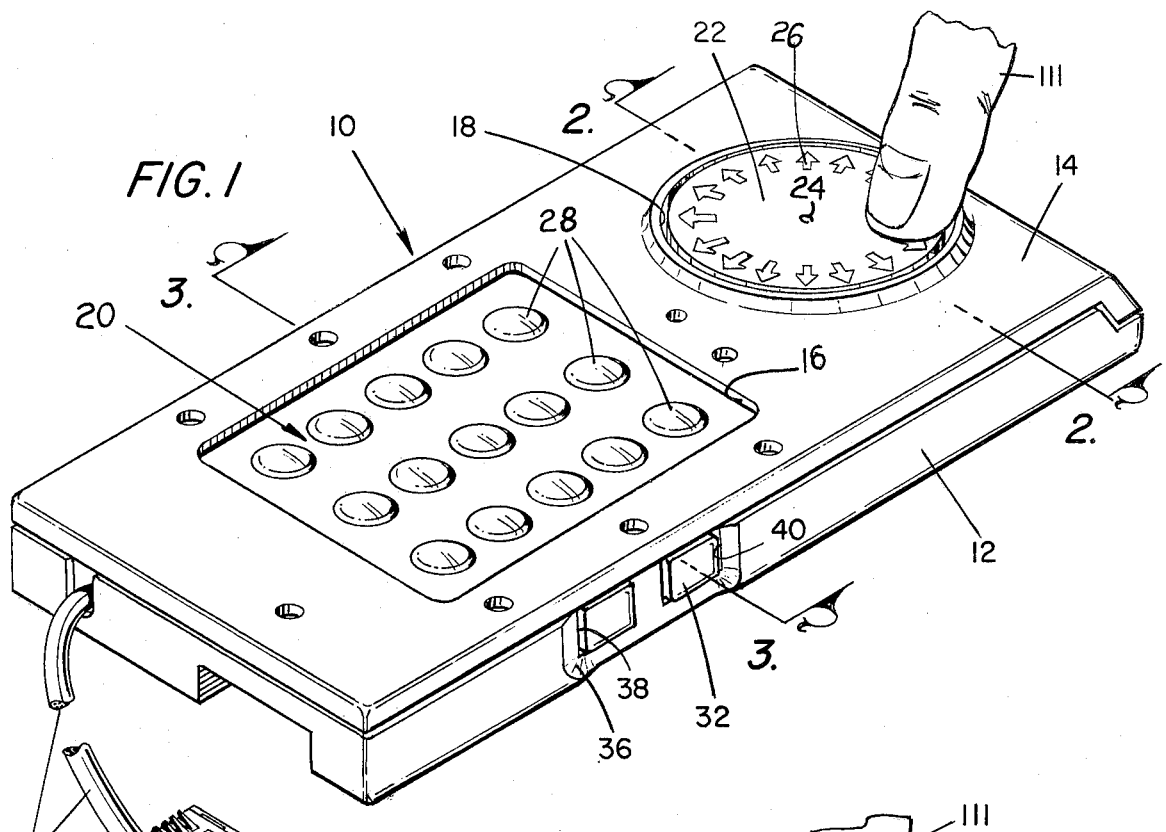
FIG. 1 is a perspective view of a switch apparatus according to the invention.

Referring now to the drawings and particularly to FIG. 1 there is shown a hand held controller or switch apparatus generally designated 10 having a housing formed from a lower housing 12 and an upper housing 14 shown in assembled relation to form a generally box-like structure having dimensions suitable for holding the apparatus 10 in the hand. The upper housing is provided with an enlarged generally rectangular opening 16 and a generally circular opening 18, the opening 16 having positioned therein a keyboard matrix assembly generally designated 20. The circular opening 18 has movably mounted therein a disc member 22 which is tiltable about the center 24 thereof to provide a signal in the form of a direction signal to one of sixteen different directions as indicated by the radially disposed arrows about the circumference thereof.

The keyboard matrix assembly 20 is provided with a plurality of depressable flexible circular bubble keys 28 in spaced aligned relation of three rows of four keys each, with each of the keys 28 being suitably inscribed with appropriate indicia such as numbers or other alphanumeric symbols. As will hereinafter be discussed, the switch apparatus 10 is adapted particularly for use with an electronic video game wherein an image formed on the cathode ray tube is to be moved or displaced on the screen in response to input signals received from manual operation of one of the keys 28 of the keyboard assembly 20 and depression or tilting of the disc member 22. Additional signals may be provided by means of a pair of rockable switch members 32 and 34 (see also FIG. 3) positioned on opposite long sides of the lower housing 12. The switch members 32 and 34 have a pair of aligned outwardly extending surfaces spaced from each other for being received within a recess 36 on the side of the lower housing 12, the recess 36 having first and second openings 38 and 40 with an intermediate section 42 of the housing defining openings for the two "buttons" of the switch members 32 and 34.

Each of the switch members 32 and 34 is generally identically configured, and as will hereinafter be described, are electrically interconnected for right hand or left hand control. Each of the switch members 32 and 34, by depressing one side or the other, may be electrically arranged to provide two discrete and opposite signals if desired.

Effectively the switch apparatus 10 is functionally divided into three portions, these being a keyboard portion, a directional signal control portion, and an auxiliary switch portion. The keyboard portion includes the keyboard matrix assembly 20 which, upon depression of any one of the keys 28, or any sequence of the keys 28, can be utilized to generate signals used for command purposes as part of the overall game play. The keyboard portion may also be utilized for resetting the controller apparatus of the game. The directional control portion includes the disc member 22 and the associated conductive patterns to be hereinafter described for generating a signal for a desired direction of travel of an image on the screen under control of the operator. The auxiliary switch portion which includes the rockable switch members 32 and 34, likewise in conjunction with the conductive members therebeneath, can be utilized, for example, to issue signals representative of a single repetitive type command, such as "fire" if the game employs images projecting missiles or the like. All of the portions need not be utilized for a particular electronic video game. For example, of more recent vintage are the cartridge type video games wherein different cartridges provide different game formats. For example, one cartridge may provide a type of game in which images are positioned on the screen in response to computer or microprocessor commands with movement of the images being under machine control. A second image may be under operator control with the second image projecting a missile in response to an operator command or input. A second cartridge may provide a blackjack game or roulette game or the like in which directional control is not required but other game commands may be required by the operator. With the controller or switch apparatus 10 according to the invention, a large number of game variables may be accommodated in a readily portable compact hand held unit. The keyboard assembly 20 provides capability for any one of a number of nonrepetitive command situations while the directional control portion can provide image position control by tilting of the disc member 22. In addition, for repetitive commands of an "up-down" nature, which may be applicable to a large number of games, can be accommodated by means of the rockable switch members 32 and 34.

Figure 2:
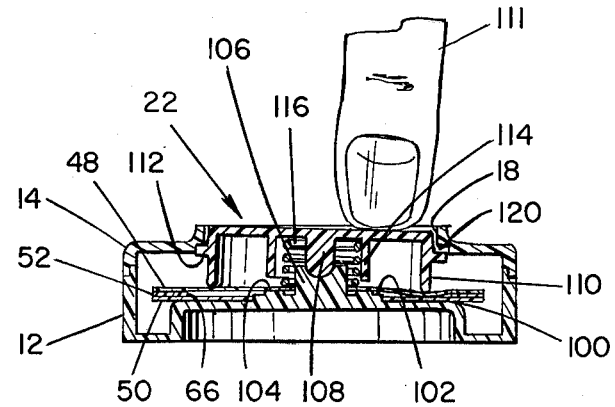
FIG. 2 is a cross-sectional view of the switch apparatus of FIG. 1 taken generally along line 2—2 thereof.
Figure 3:
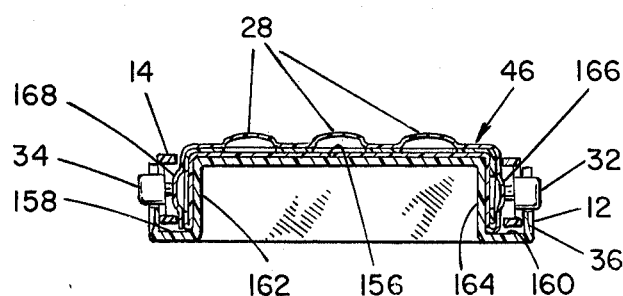
FIG. 3 is a cross-sectional view of the switch apparatus of FIG. 1 taken generally along line 3—3 thereof.
Figure 4:
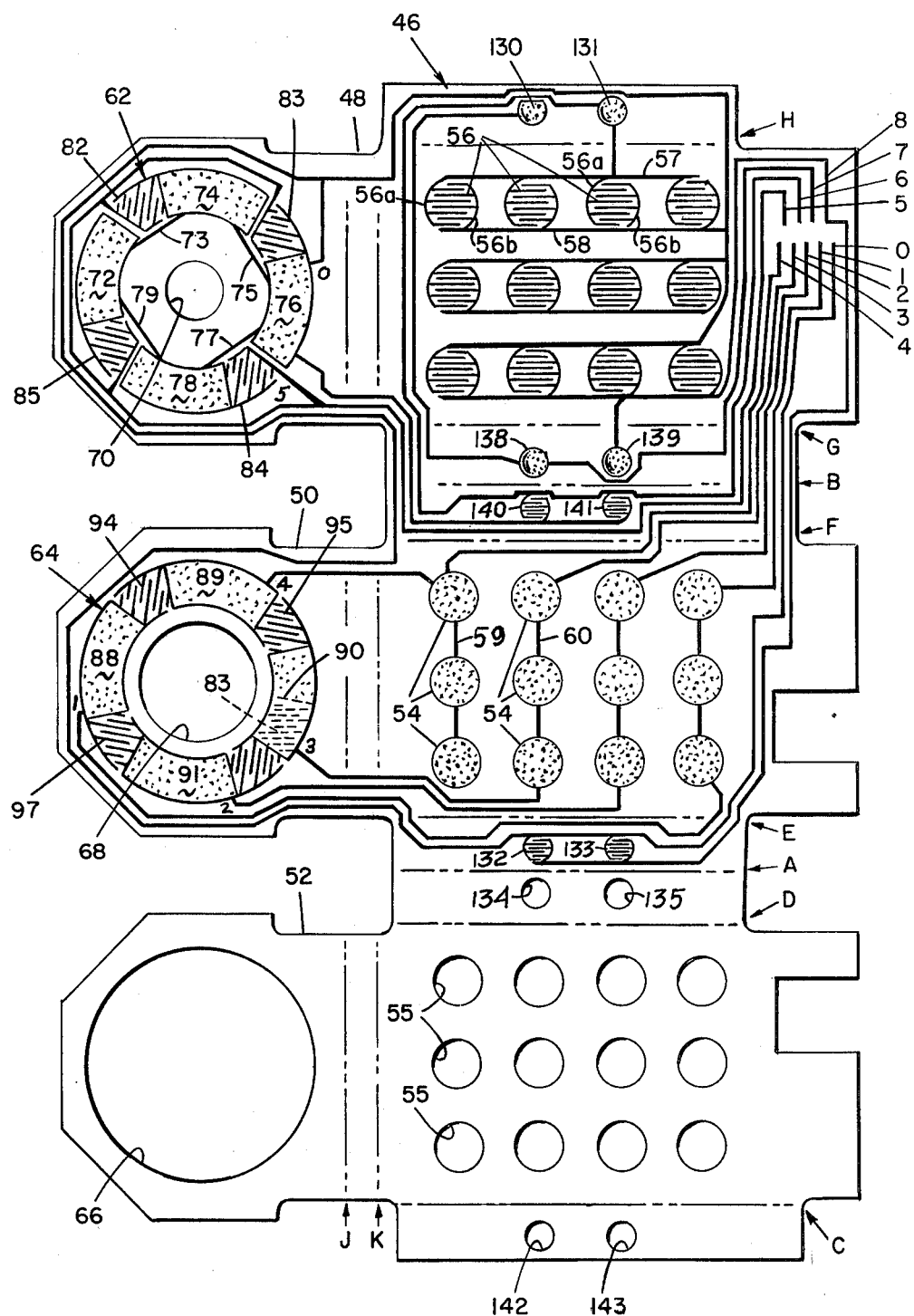
FIG. 4 is a plan view illustrating the flexible printed circuit utilized in the switch apparatus of FIG. 1.

By reference to FIGS. 2–4 also, and particularly to FIG. 4, the apparatus 10 includes a flexible printed circuit substrate, generally designated 46 which is flexible, foldable and bendable and may be formed for example from a Mylar sheet of material with electrically conductive conductors and patterns on the surface thereof. The sheet or substrate 46 is divided into three discrete sections designated 48, 50 and 52 respectively. FIG. 4 illustrates, in plan view, the substrate 46 in plan view prior to folding and bending with sections 48, 50 and 52 having generally identically configured perimeters. Sections 48 and 50 have thereon conductive portions, leads and patterns on the same side of the substrate 46 so that when folded, the conductive areas will be in facing relation with each other. The section 52 is provided with no conductive portions to act as an insulator between sections 48 and 50 when appropriately folded over with certain portions of section 52 being cut away to permit contact between spaced conductive portions of sections 48 and 50 when one section is pressed toward the other where a suitable opening is provided in the insulating section 52.

More specifically, the keyboard portion or keyboard assembly 20 has the keys 28 thereof formed by providing on the lower section 50 three rows of four each of circular fully conductive areas 54. The section 52 is provided with a similar pattern of apertures 55 which, with section 52 folded along the crease designated "A", will lie immediately above, and in alignment with the conductive areas 54. With the first section 48 then folded over along the crease designated "B" the keyboard pattern on section 48 will then overlie the apertures 55. The keyboard pattern on section 48 includes a plurality of circular areas 56, each area 56 having interleaved pairs of conductors connected to oppositely disposed conductor segments 56a and 56b for each area 56. The conductor 56a of each row are interconnected by means of conductive leads 57 while each conductor 56b of each row are interconnected by means of conductive lead 58. A given lead 57 or 58 of each row is then connected to one lead of each of the other rows to provide a common connection. The other of the leads 57 or 58 of each row then provides an individual output lead for the upper section 48, that is, a common lead and three row leads. The conductive segments 54 are electrically connected in a direction generally perpendicular to the direction of connection of the areas 56, that is, the aligned ones in the three rows are electrically interconnected to provide four output leads. As viewed in FIG. 4 the left hand column, which would correspond to the upper three keys 28 are interconnected by the conductive path or lead 59 while the next column is interconnected by means of the conductive lead 60. By point of reference, the section 48 will be referred to as the upper section with the section 50 being referred to as the lower section. When the key areas 56 of the upper section 48 are depressed through the apertures 55 individually, or in sequence, toward the area 54 of the lower section 50 a keyboard matrix is formed for providing signals indicative of the particular key area being depressed.

The directional control portion of the printed circuit substrate 46 includes a first ring pattern generally designated 62 on the first section 48 and a second generally identically configured ring pattern 64 formed on the surface of the second section 50. The intervening insulating section 52 is provided with a circular aperture 66 having a diameter generally equal to or slightly smaller than the outer diameter of the ring patterns 62 and 64. The second section 50 is provided with a circular aperture 68 concentric to the ring pattern 64 of a diameter slightly smaller than the inner diameter of the pattern 64 while the first section 48 is provided with a circular aperture 70 of much smaller diameter than the diameter of the aperture 68, the aperture 70 being concentric with the ring pattern 62. With the section 52 overlying the section 50 and the second 48 then folded over for overlying the so folded sections, the conductive areas of the ring pattern 62 will overlie those of the ring pattern 64 with electrical connection being completed, in a manner to be hereinafter described, by depression of a portion of the ring pattern 62 toward the adjacent portion of the ring pattern 64.

Ring patterns 62 and 64 are constructed and arranged to provide suitable encoding means which are compact, efficient and ultimately provide, in the embodiment illustrated, sixteen unique five-bit binary numbers of sixteen different control directions. Each of the ring patterns 62 and 64 is generally identically configured with the interconnection of ring pattern 62 being slightly different between segments, and further, with the two ring patterns 62 and 64 in overlying facing relation, one ring pattern is offset with respect to the other as will now be described. The leads printed on the substrate 46 adjacent the far end of section 48 are referenced with digits 0, 1, 2, 3, 4 and 5 with the corresponding leads adjacent each of the ring patterns 62 and 64 being numbered to indicate the electrical path of each of the leads. In addition, each segment of each of the ring patterns 62 and 64 will be assigned a reference numeral.

The ring pattern 62 is provided with four generally identical diametrically opposed fully conductive arcuate segments 72, 74, 76 and 78 all of which are interconnected by conductive lead portions 73, 75, 77, and 79 with all of the conductive segments being connected to lead "0". Interposed between each of the fully conductive segments are generally identically configured segments 82–85, each of the segments 82–85 having interleaved non-contacting spaced conductor pairs disposed in generally parallel relation along a secant with one half the pair of conductors being electrically connected to the adjacent fully conductive segment positioned in mixed clockwise relation as viewed in FIG. 4. The other half of the pairs of conductors are electrically insulated from the first half and the fully conductive segments with the other half of the pair of conductive segments being interconnected to each other and to lead "5". The arc of the intermediate segments 82–85 are approximately one-half the angles of the fully conductive segments 72, 74, 76 and 78.

Similarly, the second ring pattern 64 has the outer and inner diameters thereof generally equal to the outer and inner diameters of the first ring pattern 62. The ring pattern 64 is likewise provided with four fully conductive segments 88–91, all of which are generally identically configured and diametrically opposed in pairs. In the intervening spaces, there are likewise provided four arcuate segments 94–97 inclusive, these segments likewise being formed as interleaved non-contacting spaced conductor pairs in generally parallel relation disposed along a secant direction. The electrical connection of the ring pattern 64 differs however from that of the ring pattern 62 with each half of the conductor pairs being connected electrically to the adjacent fully conductive arcuate segment. Each of the fully conductive segments is then electrically connected to a different lead. Specifically, fully conductive segment 88 along with the adjacent half of the conductor pairs in segment 97 along with the adjacent half of the conductor pairs in segment 94 are electrically connected to lead "1". Similarly, the fully conductive segment 91 with the adjacent half of the conductor pair in segment 97 along with the adjacent half of the conductor pair in segment 96 are connected to lead "2". The fully conductive segment 90 along with the adjacent halves of the conductor pairs in segments 96 and 95 are connected to lead "3", and fully conductive segment 89 along with the adjacent halves of the conductor pairs in segments 94 and 95 are connected to lead "4".

With the ring pattern 62 of section 48 overlying and concentric with the ring pattern 64, as viewed from the top of the switch apparatus 10 as shown in FIG. 1, the upper pattern 62 will be offset counterclockwise through an angle generally corresponding to the angle of one of the smaller intermediate segments of conductor pairs. This is illustrated in dotted lines in FIG. 4 wherein the segment 83 is shown in dotted lines superimposed on the fully conductive segment 90 of the ring pattern 64 occupying approximately one-half the area thereof. Similarly, each segment of the ring pattern 62 will be angularly offset relative to the adjacent segment of the ring pattern 64 through the same angle. It is to be understood that the terminal edges of each segment do not extend along a true radius, the main requirement being that the edges are in aligned spaced relation with the ring pattern 62 overlying and in proximate relation to the ring pattern 64 to enable clearly defined zones of contact to provide the appropriate unique directional control signals.

Referring now to FIGS. 1, 2, and 4, the mechanical aspects of the assembly and operation of the directional signal control portion will be discussed. With the section 52 of the substrate 46 folded over along crease "A" the enlarged aperture 66 thereof will lie generally adjacent to and in alignment with the outer diameter of the ring pattern 64. The section 48 is then folded over the section 52 with the ring patterns 62 and 64 having the outer diameters thereof in generally aligned relation with spacing therebetween being provided by means of the insulating layer of section 52.

As shown in FIG. 2, the lower housing 12 is configured with a generally planar inwardly spaced surface 100 configured for receiving thereon the so-folded substrate 46 with the second section 50 resting thereon, the third or insulating section 52 immediately thereabove, with the first section 48 lying thereon, the section 48 being the "top" section. The surface 100 is provided with aligning shoulder means including a first circular disc-like shoulder 102 having an outer diameter generally equal to the inner diameter of opening 68 of the second section 50 to thereby position the second section 50 on the surface 100 of lower housing 12. As can be seen, the aperture 66 of the insulating section 52 is sufficiently large to enable the ring patterns 62 and 64 to have the conductive portions or segments thereof in facing aligned relation. The shoulder 102 is provided with a second shoulder 104 on the surface thereof the shoulder 104 being circular and having an outer diameter slightly smaller than the diameter of shoulder 102 with the inner portion of the section 48 surrounding aperture 70 resting on the shoulder 104. The combined height of shoulders 102 and 104 is sufficient to maintain the non-contacting spacing between the ring patterns 62 and 64. Extending upwardly and generally centrally relative to the shoulder 102 is a socket member 106 configured for receiving therein a ball portion 108 of a depending centrally disposed shaft portion of the disc member 22 to permit the tilting thereof when assembled.

The disc member 22 is an inverted cup-shaped member having a circular sidewall 110 with an outwardly extending flange portion 112 about the periphery thereof with a centrally disposed sleeve 114 concentrically arranged relative to the sidewall 110 but of smaller diameter. The diameter of sleeve 114 is sufficient for enabling the positioning of a coil spring 116 about the shaft 108 with the spring 116 being between the shaft 108 and sleeve 114, the disc member 22 then being assembled by insertion of the ball portion of shaft 108 into the socket 106 with the spring 116 in place as illustrated in FIG. 2. The enlarged opening 18 of the upper housing 14 is provided with a peripheral ridge 120 on the undersurface thereof, the ridge 120 having an outer diameter slightly greater than the outer diameter of the flange 112 for captively retaining the disc member 22 within the housing so assembled while permitting the disc member 22 to be depressed or tilted by means of the finger 111. The sidewall 110 of the cup shaped portion has a diameter which teminates approximately midway between the outer and inner diameters of the arcuate segments of the aligned facing ring patterns 62 and 64 so that tilting of the disc member 22 in the manner illustrated in FIG. 2 by the finger 111 flexes the upper section 48 to thereby provide a contact between a segment of the ring pattern 62 immediately therebeneath with a segment or segments of the ring pattern 64 immediately beneath the portion so flexed.

With the depression of the disc member 22 a portion of the peripheral sidewall 110 will urge a zone of the conductive portions of the segments of ring pattern 62 into electrical contact with the corresponding portion of ring pattern 64 immediately therebelow to provide an electrical signal indicative of some variable, such as direction. By reference to FIG. 5, there is diagrammatically illustrated with reference to a ring pattern 64 having fully conductive segments 88–91 and intervening segments 94–97 formed of the conductive pairs. The radially outwardly extending lines about the periphery thereof are equiangularly displaced to define sixteen different contact zones, with the number or sequence of numbers within each zone corresponding to the particular leads energized when contact is made in that zone by depression of the disc member 22 urging the portion of the ring pattern 62 into contact therewith. For example, the lowermost zone indicates lead "1" while the adjacent zone counterclockwise has imprinted therein "1, 2" indicating the combination of lead "1" and lead "2". Assuming lead 1 conduction as being the initial bit in a five-bit number the code for the first zone will be 10000, while the next zone would generate the binary code 11000. Similarly, contact in the next zone labeled "1, 2, 5" would generate a binary code of 11001. Similarly, all other zones would generate unique five-bit numbers wherein the numeral "1" indicates a 1 in the first bit location with the numeral "2" indicating a 1 in the second bit location, the numeral "3" indicating a 1 in the third bit location, the numeral "4" indicating a 1 in the fourth bit location, and the numeral "5" indicating a 1 in the fifth bit location. Thus, it can be seen that with the electrical connection of the otherwise generally identical ring patterns 62 and 64 so configured and so arranged as hereinabove described, sixteen unique binary codes are generated depending upon the point or zone of contact between the ring patterns depending upon the point of tilt of the disc member 22. With the switch apparatus 10, the controller may be oriented relative to the cathode ray tube to further simplify direction control with proper orientation betweeb the disc member 22 and the video screen.

Referring now to FIGS. 1, 3, and 4, the construction of the keyboard portion and auxiliary switch portions will be discussed. By reference to FIG. 4, the generally planar sheet or substrate 46 may be folded along different lines or creases, with the substrate 46 having suitable perforations or slits along the crease lines. In addition to the creases designated "A" and "B", commencing from the bottom in FIG. 4 there is a crease line designated "C" and "D" generally parallel to crease "A" on either side of the keyboard apertures 55 in the third section 52 of the substrate 46. Corresponding crease lines are also located on either side of sections 50 and 48, these being designated crease lines "E" through "H" inclusive, all of these crease lines likewise being parallel to crease lines "A" and "B" as well as parallel to each other. Additional crease lines extend in a vertical direction relative to the position of substrate 46 in FIG. 4, these crease lines being parallel and being designated "J" and "K". These latter two crease lines are three separate pairs of crease lines each of the pairs lying along a given line with the portions of each pair being located respectively in sections 48, 50 and 52 to enable bending of the composite assembly with section 52 overlying section 50 and section 48 overlying section 52.

Electrically, referring to FIG. 4, the auxiliary switches actuated by the rockable switch members 32 and 34 are formed on the substrate 46 with fully conductive circular pads or patterns 130 and 131 (adjacent the edge of section 48) being spaced and aligned for coacting with circular areas 132 and 133 respectively (in the strip between crease "A" and "E"), the areas 132 and 133 being similarly circularly configured and formed of spaced interleaved non-contacting parallel conductors. With the substrate 46 folded the insulating section 52 will have the apertures 134 and 135 thereof adjacent areas 132 and 133 respectively, interposed between areas 132 and 133 respectively and fully conductive patterns 130 and 131 respectively. These two switches so formed will be operated on by the rockable switch member 34 (see FIG. 3). The rockable switch member 32 will coact with a similar second pair of switches formed from fully conductive pads or patterns 138 and 139 coacting with areas 140 and 141 positioned on the opposite side of crease "B". The areas 140 and 141 are likewise similar to the conductive pairs of areas 132 and 133. With the substrate 46 appropriately folded, the apertures 142 and 143 along the edge of section 52 will be interposed between the aligned facing switch sections, that is with aperture 142 between pattern 138 and area 140, and similarly aperture 143 between pattern 139 and area 141 respectively.

Referring again to FIG. 4, the upper right hand portion of the substrate 46, that is, the right hand end of section 48 depicts the conductors which are then suitably connected to a cable or harness 150 (see FIG. 1) for coupling to an electrical connector 152. The connection of the harness 150 to the conductors is not illustrated but may take any convenient form such as a spring type connector having spring prongs urging against the conductors. In addition to the conductors previously labeled "0"–"5", the other three conductors have been labeled "6", "7", and "8". The keyboard areas 54 and 56, in the following description will be referred to by rows, there being three rows, and columns, there being four columns, with the columns in FIG. 4 extending along a vertical line as the substrate 46 is oriented, with the rows extending horizontally. The terms left, right, top and bottom will also be utilized as terms of reference with respect to the substrate 46 layout of FIG. 4. Conductor "8" is electrically connected to one side of the bottom row of the conductive grids or pairs of the areas 56 of section 48 as well as to the fully conductive pad 139 and the bottom half of the conductive pairs or grids of areas 132 and 133.

Conductor "7" is electrically connected to the conductive pad 138 as well as the conductive pad 130. Conductor "6" is electrically connected to the conductive pad 131 as well as the upper half of the top row of the grids or areas 56 on the keyboard portion of section 48. The lower half of the upper row of grids or areas 56 is electrically connected to the upper half of grids or areas 56 of the middle row and to the upper half of the portions of the lower row of grids or areas 56, and also to conductor "0" which is connected to segment 76 of the ring pattern 62. The other side of the middle row of grids or areas 56 is electrically connected to fully conductive pad 130, fully conductive pad 138 out to conductor "7".

Lead "0" on section 50 of the substrate 46 is also connected to the upper half of the conductors of the grids or areas 132 and 133. With this electrical connection, the upper auxiliary switches created by grids 140 and 132 and operated by the rockable switch members 32 and 34 are thus connected in parallel so that either switch performs the same function when tilted in the same direction to enable right or left hand use of the controller of the switch apparatus 10. The other two, or lower, auxiliary switches are each provided with a separate code for separate control functions.

With respect to the keyboard matrix formed by the fully conductive pads 54 on section 50, the left column of pads 54 are interconnected electrically to each other and to lead "4" while the column adjacent thereto have the pads 54 thereof electrically interconnected by conductive segment 60 to each other and to conductor "3". Similarly, the third column from the left has the pads 54 thereof electrically connected to each other and to conductor "2" while the right hand column has the pads 54 interconnected to each other and to conductor "1". With the electrical connections as hereinabove described, certain arcuate segments of the ring pattern 64 are electrically connected to the matrix of fully conductive pads 54 of the second section 50, certain portions of the keyboard matrix of section 48 are connected to conductor "0" (the common connection) which is electrically connected to segments 72, 74, 76 and 78, while the other conductive portions are electrically connected to individual conductors "6" through "8" inclusive.

With the electrical configuration of the conductive portions of the substrate 46 as previously described, depression of any of the keys 28 in FIG. 1 results in a unique binary code for each key. Similarly, tilting or rocking of either switch member 32 or 34 at the same or upper side thereof results in the same unique code, although the code is different from any other code generated by the switch apparatus 10. In addition, tilting of the lower portions of switch members 32 and 34 will result in two additional codes being generated, these two codes being different from any other code generated.

As illustrated in FIG. 3, with the substrate 46 in folded relation, it is then positioned into the lower housing 12 which is provided with a broad surface 156 which is generally planar for supporting the keyboard matrix portion of the so folded unit. On either side of surface 156, the housing 12 is provided with trough portions 160 into which extend the auxiliary switch portions of the substrate 46, the back surface of which is supported by the adjacent sidewalls 162 and 164 disposed inwardly of the troughs 158 and 160 respectively, the sidewalls 162 and 164 being generally perpendicular to the plane of the surface 156 and contiguous thereto. As can be seen in FIG. 3, each of the keys 28 of the keyboard matrix is formed of a "bubble" extending upwardly from the surface 156 with depression thereof resulting in the grids of areas 56 passing through a corresponding aperture 55 for engagement with a corresponding conductive pad 54 which thus bridges the gap electrically between the interleaved conductors to generate a signal sensed by the output leads or conductors depending on which of the conductors are involved in the electrical contact. Similarly, each of the side switches or auxiliary switches has the outer surface thereof formed in the configuration of a bubble, these bubbles being designated 166 and 168 respectively which are moved inwardly in response to depression of one of the switch members 32 and 34 respectively for providing the electrical contact. Alternatively, the areas designated 56 of the keyboard matrix of section 48 may be planar in configuration with the "bubbles" being provided by one more layer of flexible material on top of the folded substrate with the additional layer having the indicia imprinted or inscribed thereon to denote the particular key 28 by a symbol, or an alphanumeric symbol.

Referring now to FIG. 6, the switch apparatus 10 provides binary output signals over data busses 170-172 inclusive indicative of signals of direction control, keyboard control or auxiliary switch control respectively. These signals are fed to a decoder 175 which then transmits the signal over bus 176 to a processor 178. The processor 178 may have incorporated therein the decoding means of decoder 175 and will also include means for converting the information into cathode ray tube or video control signals which are then transmitted over data bus 180 to a suitable cathode ray tube or television screen 182. The particular method and means of decoding the signal outputs of the switch apparatus 10 does not form a part of the present invention since the switch apparatus 10 may be utilized to provide coded outputs indicative of other variables utilizable in systems other than video control. Similarly, the encoder arrangement provided by the disc member 22 operating in conjunction with the ring patterns 62 and 64 may likewise be useable in systems not requiring direction control. In addition, within the structure of the invention, the ring patterns 62 and 64 may be configured to provide more than sixteen outputs by enlarging the diameter of the patterns and providing a different number of arcuate segments within the pattern, the basic requirement being that there be a given number of fully conductive arcuate segments with the same number of intervening segments formed of interleaved non-contacting conductors with the arc of the fully conductive segments being approximately twice the arc of the intervening segments with the two patterns being generally identical and in offset relation relative to each other in a circumferential direction by an angle generally equal to the arc of one of the smaller or intervening segments.

In accordance with the preceding description, there has been shown and described a controller of compact size, structurally simple, incorporating few parts, and providing three discrete signal generating portions, that is the keyboard portion, the direction control portion and the auxiliary side switches portion, resulting from a single printed circuit substrate 46 appropriately patterned with conductive areas and fittable within a lower housing 12 configured to provide opposite side switch control as well as top panel control in a hand held unit. By way of example, and not of limitation, the assembled unit is approximately ⅝ths of an inch thick, 2⅝ths inches wide and approximately 6 inches long. In other currently available video game controllers, many of the control functions are by means of switches and the like on the control console while the hand held unit is limited to a joystick or rotary controller only. In addition, such hand held controllers of other units may include a separate button or key which requires a separate switch mechanism to be used with the electromechanical joystick or rheostat. In the instant invention, repetitive controls of a non-directional type are effected by depressing one of the rockable switch members 32 or 34 which are located along the side edges of the switch apparatus 10 at normal locations convenient for manipulation by the thumb of the operator.

While there has been shown and described a preferred embodiment it is to be understood that various other adaptations and modifications may be made within the spirit and scope of the invention.

What is claimed is:

1. In a switch apparatus, the combination comprising:
  a first substrate having a generally planar surfacd with a ring pattern thereon, said ring pattern including a plurality of generally identical fully conductive arcuate segments with intervening arcuate segments interposed therebetween, said intervening arcuate segments being formed from interleaved non-contacting pairs of conductors, the arc of said intervening segments being approximately one-half the arc of the fully conductive segments;
  a second substrate of a flexible material having a second generally identical ring pattern thereon;
  means for maintaining said second substrate in spaced proximate relation to said first substrate with said ring patterns in facing relation with one of said ring patterns offset circumferentially relative to the other by an angle generally equal to the arc of one of said intervening segments; and
  means for selectively urging any portion of said second ring pattern into conductive relation with the adjacent portion of the first ring pattern for providing a signal indicative of the portion so contacted.

2. The combination according to claim 1 wherein said first and second substrates are formed on a single sheet of flexible material.

3. The combination according to claim 2 wherein each of said ring patterns includes four fully conductive arcuate segments and four intervening segments.

4. The combination according to claim 3 wherein the segments of said first and second ring patterns are electrically connected to provide sixteen different signals indicative of contact of at least one segment of said first ring pattern with at least one segment of said second ring pattern.

5. The combination according to claim 4 wherein the interleaved conductor pairs are positioned in generally parallel relation in a direction along a secant of a circle.

6. In a switch apparatus, the combination comprising:
  housing means having first and second generally planar surfaces therein with trough portions formed on opposite sides of said first planar surface;
  a flexible substrate of insulating material having first, second and third sections similarly configured with two adjacent sections having generally identically arranged conductive areas for defining a keyboard portion, a directional control portion and an auxiliary switch portion, said third section having apertures therein so dimensioned and so arranged that with said third section folded over the adjacent section and with the other section folded over the first section, selective contact may be made through said apertures by depression of a conductive area of one section toward the conductive area of the other section, said sections when so folded being dimensionally arranged and configured for enabling the keyboard portion to rest on said first surface and the directional control portion to rest on said second surface, the edge portions of the so-folded substrate being bent into said trough portions in abutting relation with the sidewalls thereof for providing said auxiliary switch portion;

means for retaining the so-folded substrate within said housing means with said first surface, said second surface and the sidewalls of said trough portions in abutting relation with and supporting said keyboard portion, said directional control portion and said auxiliary switch portion respectively; and means in said housing means for enabling the selective actuation of a conductive area of one section toward the adjacent conductive area of the other section for providing a signal indicative of the portion so contacted.

7. The combination according to claim 6 wherein the enabling means of said housing means includes opening for enabling actuation of said keyboard portion, said directional control portion and said auxiliary switch portion.

8. The combination according to claim 7 wherein said directional control portion of said substrate includes first and second ring patterns in aligned facing relation and said housing means includes means for maintaining said ring patterns in spaced proximate relation.

9. The combination according to claim 8 wherein one of said openings in said housing means is an enlarged circular opening and a disc member within said circular opening tiltably supported within the housing in proximate relation to said ring patterns, said disc member being so configured and so dimensioned that tilting thereof flexes a portion of one of said ring patterns into conductive relation with an adjacent portion of the other of said ring patterns.

10. The combination according to claim 9 wherein said first and second ring patterns provide encoding means for providing a signal indicative of the portion of the ring patterns in contacting relation.

11. The combination according to claim 10 wherein said first and second ring patterns are generally identical and include a plurality of generally identical fully conductive arcuate segments with intervening arcuate segments interposed therebetween, said intervening arcuate segments being formed from interleaved non-contacting pairs of conductors, the arc of said intervening segments being approximately one-half the arc of said fully conductive segments.

12. The combination according to claim 11 wherein with the substrate folded, one of said ring patterns is offset circumferentially relative to the other by an angle generally equal to the arc of one of said intervening segments.

13. In a switch apparatus, the combination comprising:
housing means;
a first substrate supported within said housing means and having a generally planar surface with a ring pattern thereon, said ring pattern including a plurality of generally identical fully conductive arcuate segments with intervening arcuate segments interposed therebetween, said intervening arcuate segments being formed from interleaved non-contacting pairs of conductors, the arc of said intervening segments being approximately one-half the arc of the fully conductive segments;
a second substrate of a flexible material having a second generally identical ring pattern thereon;
means within said housing means for maintaining said second substrate in spaced proximate relation to said first substrate with said ring patterns in facing relation;
disc means tiltably supported relative to said housing means in proximate relation to said second substrate, said disc means being so dimensioned and so configured for flexing said second substrate in response to tilting of said disc means for urging a portion of said second ring pattern into conductive relation with the adjacent portion of said first ring pattern for providing a signal indicative of the portion so contacted.

14. The combination according to claim 13 wherein said disc means includes a disc member having a cup-shaped portion with the wall thereof defining a circle, the edge of said wall being in close proximate relation to said second substrate.

15. The combination according to claim 14 wherein said disc means further includes spring means normally maintaining the disc portion of said disc means in parallel relation to said second substrate.

16. The combination according to claim 13 wherein one of said ring patterns is offset circumferentially relative to the other by an angle generally equal to the arc of one of said intervening segments.

17. The combination according to claim 16 wherein each of said ring patterns includes four fully conductive arcuate segments and four intervening segments.

18. The combination according to claim 17 wherein the segments of said first and second ring patterns are electrically connected to provide sixteen different signals indicative of contact of at least one segment of said first ring pattern with at least one segment of said secnd ring pattern.

19. The combination according to claim 13 wherein said first and second substrates are formed on a single sheet of flexible material and said housing is provided with a generally planar surface for supporting said first substrate.

20. The combination according to claim 19 wherein said means for maintaining said second substrate in spaced relation to said first substrate includes an insulating section of said single sheet interposed between said first and second substrate, said insulating section having an enlarged circular aperture in general alignment with the outer circumference of said ring patterns.

21. The combination according to claim 20 wherein said first and second substrates further include conductive patterns arranged to form a keyboard matrix and said insulating section is provided with apertures configured and positioned for alignment between facing conductive areas for providing other signals in response to urging of said flexible substrate through at least one of said apertures for conductive relation between adjacent conductive areas.

22. In a switch apparatus, the combination comprising:
a first substrate having a generally planar surface with a ring pattern thereon, said ring pattern including a plurality of generally identical fully conductive arcuate segments with intervening arcuate segments interposed therebetween, said intervening arcuate segments being formed from interleaved non-contacting pairs of conductors, the arc of said intervening segments being approximately one-half the arc of the fully conductive segments;

a second substrate of a flexible material having a second generally identical ring pattern thereon; and means for maintaining said second substrate in spaced proximate relation to said first substrate with said ring patterns in facing relation with one of said ring patterns offset circumferentially relative to the other by an angle generally equal to the arc of one of said intervening segments, the urging of a portion of said second ring pattern into conductive relation with the adjacent portion of the first ring pattern providing a signal indicative of the portion so contacted.

23. The combination according to claim 22 further including disc means in proximate relation to said second ring pattern for urging it into conductive relation with said first ring pattern.

* * * * *